W. H. THOMPSON, Jr.
ROTARY ENGINE.
APPLICATION FILED FEB. 9, 1909.

966,622.

Patented Aug. 9, 1910.
2 SHEETS—SHEET 1.

Witnesses

Inventor
W. H. Thompson, Jr.
By his Attorneys

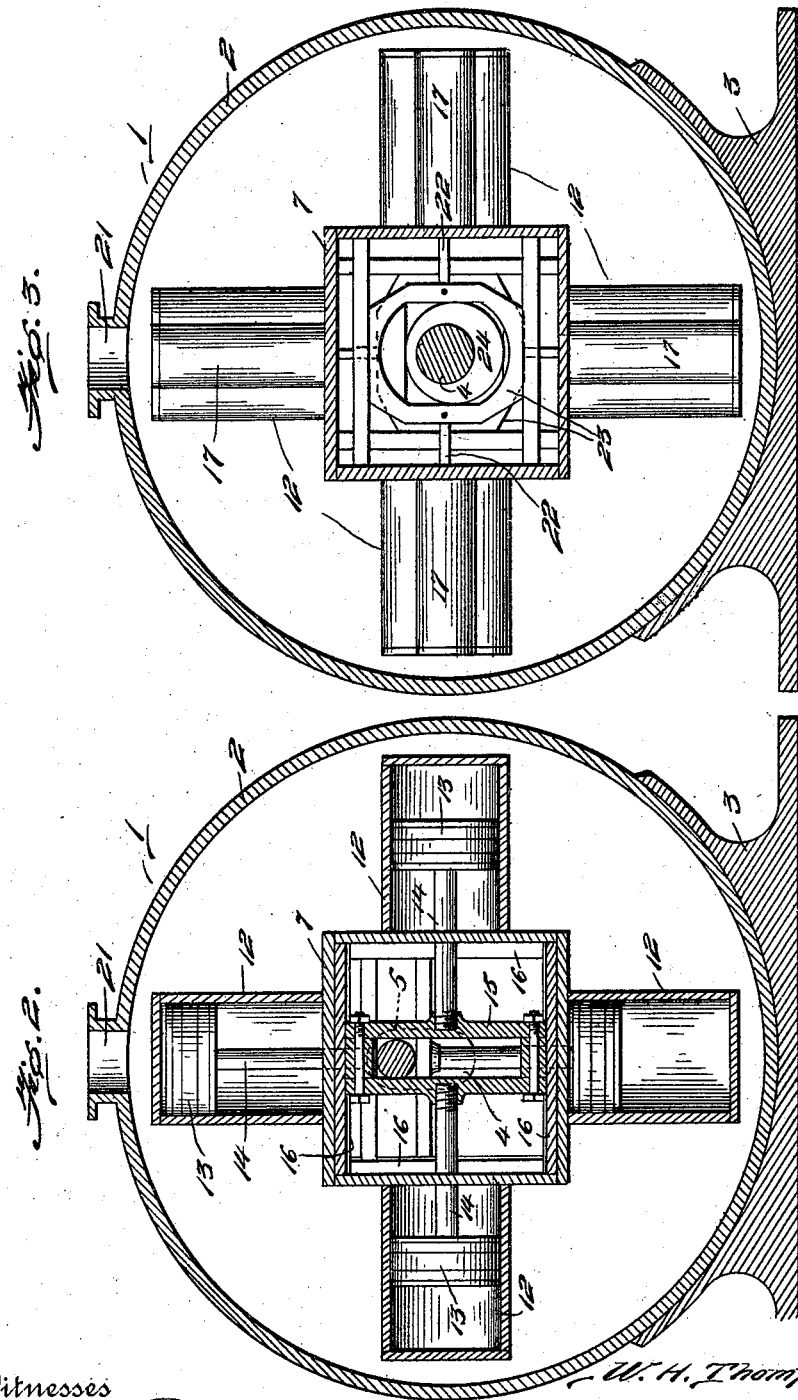

UNITED STATES PATENT OFFICE.

WILLIAM H. THOMPSON, JR., OF ST. THOMAS, NORTH DAKOTA, ASSIGNOR TO INTERNATIONAL ROTURBINE ENGINE COMPANY OF AMERICA, OF FARGO, NORTH DAKOTA.

ROTARY ENGINE.

966,622.   Specification of Letters Patent.   Patented Aug. 9, 1910.

Application filed February 9, 1909. Serial No. 476,995.

*To all whom it may concern:*

Be it known that I, WILLIAM H. THOMPSON, Jr., a citizen of the United States, residing at St. Thomas, in the county of Pembina and State of North Dakota, have invented certain new and useful Improvements in Rotary Engines; and I do declare the following to be a full, clear, and exact description of the invention, such as will enable others skilled in the art to which it appertains to make and use the same.

This invention relates to improvements in rotary engines.

The object of the invention is to provide a rotary engine in which there will be no dead centers and in which vibration will be reduced to a minimum.

With this and other objects in view, the invention consists of certain novel features of construction, combination and arrangement of parts, as will be more fully described and particularly pointed out in the appended claim.

Figure 1:
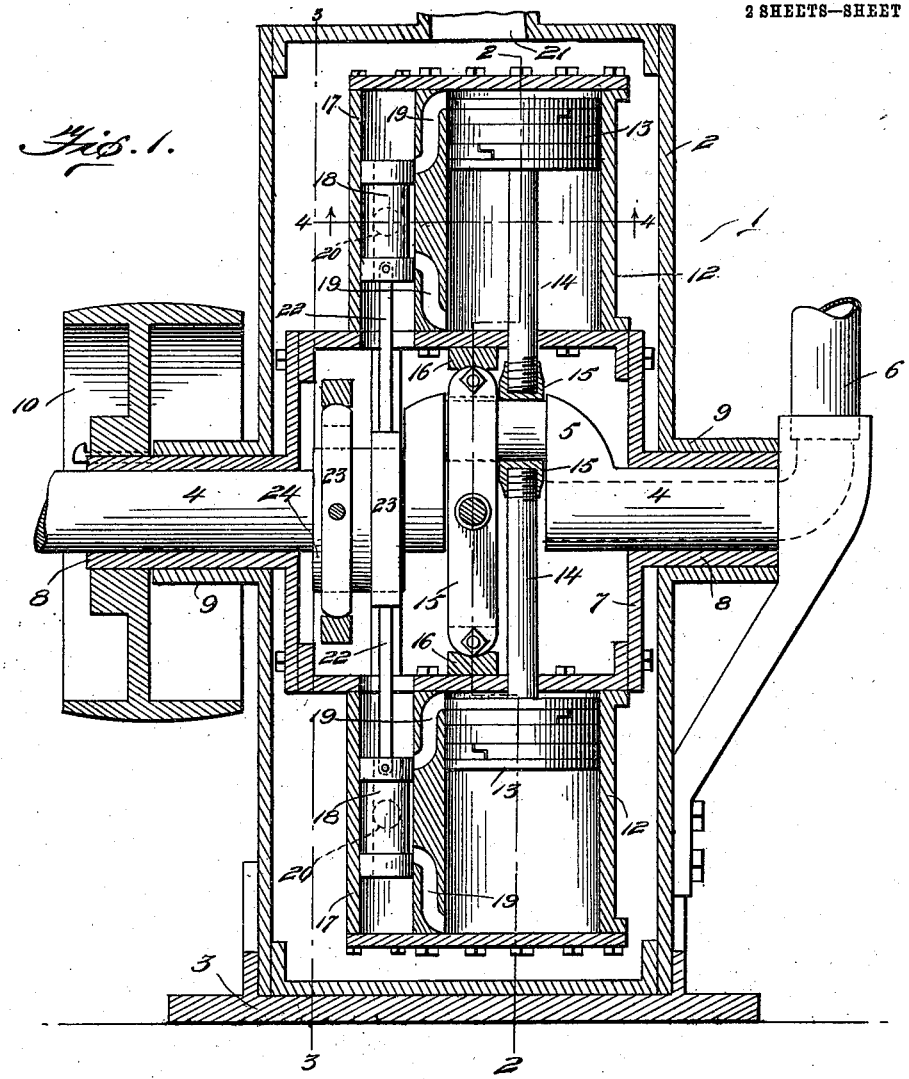
Figure 4:
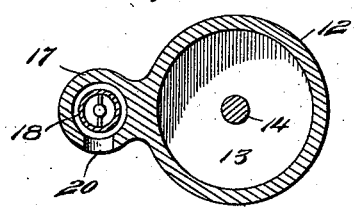

In the accompanying drawings, Figure 1 is a vertical sectional view taken on a line with the drive shaft; Fig. 2 is a similar view taken at right-angles to and on the line 2—2 of Fig. 1; Fig. 3 is a similar view on the line 3—3 of Fig. 1; Fig. 4 is a detail cross sectional view through one of the cylinders and its steam chest taken on the line 4—4 of Fig. 1.

Referring more particularly to the drawings, 1 denotes the engine which comprises an outer stationary cylindrical casing 2 which is mounted on a suitable base 3. Arranged in the outer casing 2 is a fixedly mounted shaft 4 in which is formed a crank 5. One end of the shaft 4 is tubular and has its outer end connected with a steam supply pipe 6 whereby steam is admitted to the engine through said shaft.

Revolubly mounted on the shaft 4, within the stationary casing 2 is an inner casing 7, said inner casing being substantially rectangular in form and provided on its opposite sides with tubular extensions or hubs 8 which project through and are revolubly mounted in bearings 9 formed on the opposite sides of the outer casing 2. The hubs 8 are also revolubly mounted on the opposite ends of the shaft 4. The hub 8 on one side of the inner casing 7 is extended beyond the bearing 9 of the adjacent side of the outer casing and on said extended end of the hub 8 is fixedly mounted a drive pulley 10.

Secured to the opposite sides of the inner casing 7 is a series of cylinders 12, said cylinders being arranged in pairs, the cylinders of each pair being arranged diametrically to each other on the opposite sides of the casing 7 as shown. In the cylinders 12 are pistons 13 which are connected by piston rods 14 to links 15 arranged at right-angles to each other on the crank 5 of the shaft 4. The links 15 are slidably engaged with suitable guides 16 arranged on the inner sides of the casing 7. The links are reciprocated by means of the piston rods 14 and pistons 13 and by their engagement with the crank on the stationary shaft 4 to cause the inner casing and cylinders to be revolved around the crank shaft thereby creating a rotary movement which is transferred to the drive pulley 10 through the hub 8 of the inner casing on which said pulley is fixedly mounted.

On the cylinders 12 are arranged steam chests 17, the inner ends of which open into the casing 7 and from said casing receive the live steam which enters the casing through the tubular end of the shaft 4. The steam chests 17 are provided with tubular valves 18 which permits steam to pass through and which open and close the steam inlet ports 19 in the cylinder, said ports alternately serving as inlet and exhaust ports. The steam chests 17 are also provided with steam exhaust ports 20 which communicate with a space formed by the central reduced portion of the valve and serve to discharge the exhaust steam from the cylinders into the outer stationary casing 2 from whence the exhaust steam is discharged through a suitable port 21.

The valves 18 are provided with operating rods 22 which are connected to eccentric straps or bands 23 arranged on cams or eccentrics 24 which are fixedly mounted on the stationary shaft 4 whereby as the inner casing and cylinders are revolved the valves in the steam chests will be reciprocated at the proper time to open and close the steam inlet ports 19 of the cylinders.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described and ascertained the nature of my invention, what I claim as new and desire to secure by Letters-Patent, is:—

In a rotary engine, a stationary outer casing, a stationary shaft arranged in said outer casing and having a single crank offset, said shaft being tubular and connected with a steam supply, an inner casing revolubly mounted on said shaft and inclosing the crank offset and the open inner end of said shaft, whereby the steam passing through said shaft will enter the inner casing, links arranged to slide on the crank of said shaft, at right angles to each other, guiding ribs on the inner part of the inner casing to guide said links in their movements, a series of oppositely arranged cylinders carried by said inner casing, pistons slidably mounted in said cylinders, piston rods connecting the pistons with said links, whereby the movement of the pistons will cause the links to bear against the crank and revolve the inner casing and cylinders on the shaft, tubular bearing extensions or hubs arranged on opposite sides of said inner casing, whereby the latter is removably mounted on said shaft, a belt pulley fixedly mounted on the extended end of one of said hubs and steam valves communicating with the inner casing to control the action of the pistons.

In testimony whereof I have hereunto set my hand in presence of two subscribing witnesses.

WILLIAM H. THOMPSON, Jr.

Witnesses:
JULIUS C. JOHNSON,
WILLIAM ANDERSON.